(12) United States Patent
Ryon et al.

(10) Patent No.: US 11,859,821 B2
(45) Date of Patent: Jan. 2, 2024

(54) PASSIVE SECONDARY AIR ASSIST NOZZLES

(71) Applicant: Collins Engine Nozzles, Inc., Des Moines, IA (US)

(72) Inventors: Jason A. Ryon, Carlisle, IA (US); Lev A. Prociw, Johnston, IA (US); Brandon P. Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 18/074,847

(22) Filed: Dec. 5, 2022

(65) Prior Publication Data

US 2023/0097301 A1     Mar. 30, 2023

Related U.S. Application Data

(62) Division of application No. 17/360,207, filed on Jun. 28, 2021, now Pat. No. 11,543,130.

(51) Int. Cl.
*F23R 3/10* (2006.01)
*F02C 7/264* (2006.01)

(52) U.S. Cl.
CPC ............... *F23R 3/10* (2013.01); *F02C 7/264* (2013.01); *F05D 2240/35* (2013.01)

(58) Field of Classification Search
CPC .......... F02C 7/264; F02C 7/266; F23R 3/045; F23R 3/16; F23R 3/343; F23R 3/14; F23R 3/20; F23R 3/28; F05D 2240/35
See application file for complete search history.

(56) References Cited

U.S. PATENT DOCUMENTS 3,066,662 A * 12/1962 May .................... F02B 19/1004
                                                                     123/143 B
3,691,766 A *  9/1972 Champion ............. F02C 7/264
                                                                        60/746

(Continued)

FOREIGN PATENT DOCUMENTS

CN      112737328 A  *  4/2021 ................ H02J 7/35
CN      112737328 A       4/2021

(Continued)

OTHER PUBLICATIONS

Extended European Search Report dated Nov. 9, 2022, issued during the prosecution of European Patent Application No. EP 22181590.5.

*Primary Examiner* — Craig Kim
(74) *Attorney, Agent, or Firm* — Locke Lord LLP; Joshua L. Jones; Scott D. Wofsy

(57) ABSTRACT

An injection system includes an inner nozzle body defining a first air path along a longitudinal axis. The first air path defines a converging-diverging section between an upstream portion of the first air path and an outlet orifice of the first air path. A main orifice is defined at a narrowest portion of the converging-diverging section. A fuel circuit wall is outboard of the inner nozzle body. A fuel path is defined between the fuel circuit wall and the inner nozzle body. An outer nozzle body outboard of the fuel circuit wall has a second air path defined through the inner nozzle body for communication of air from the outer nozzle body into the first air path, wherein the second air path meets the first air path at a second orifice in the first air path downstream of the main orifice of the inner nozzle body.

8 Claims, 5 Drawing Sheets

(56) References Cited

U.S. PATENT DOCUMENTS

| | | | |
|---|---|---|---|
| 3,866,413 A | 2/1975 | Sturgess | |
| 3,954,389 A | 5/1976 | Szetela | |
| 4,112,675 A | 9/1978 | Pillsbury et al. | |
| 4,192,139 A * | 3/1980 | Buchheim | F23R 3/30 |
| | | | 60/750 |
| 4,262,482 A | 4/1981 | Roffe et al. | |
| 4,860,533 A | 8/1989 | Joshi | |
| 5,027,603 A * | 7/1991 | Shekleton | F23R 3/16 |
| | | | 60/743 |
| 5,085,040 A | 2/1992 | Tilston | |
| 5,515,681 A | 5/1996 | DeFreitas | |
| 5,636,511 A | 6/1997 | Pfefferle et al. | |
| 6,367,262 B1 * | 4/2002 | Mongia | F23R 3/286 |
| | | | 60/748 |
| 6,405,523 B1 * | 6/2002 | Foust | F23R 3/14 |
| | | | 60/776 |
| 6,912,857 B2 * | 7/2005 | Schmotolocha | F23Q 13/00 |
| | | | 60/776 |
| 7,832,212 B2 * | 11/2010 | Bunker | F23D 14/62 |
| | | | 60/737 |
| 8,864,492 B2 * | 10/2014 | Shi | F23R 3/007 |
| | | | 431/253 |
| 8,966,879 B1 * | 3/2015 | Munson | F02K 9/95 |
| | | | 60/39.77 |
| 9,567,912 B2 | 2/2017 | Prociw et al. | |
| 2004/0168442 A1 | 9/2004 | Schmotolocha et al. | |
| 2005/0053876 A1 | 3/2005 | Joos et al. | |
| 2006/0248898 A1 * | 11/2006 | Buelow | F23R 3/14 |
| | | | 60/776 |
| 2009/0255258 A1 * | 10/2009 | Bretz | F23D 11/107 |
| | | | 60/737 |
| 2012/0111013 A1 * | 5/2012 | Parsania | F23R 3/286 |
| | | | 60/737 |
| 2012/0117976 A1 * | 5/2012 | Krull | F23Q 3/008 |
| | | | 60/776 |
| 2013/0239575 A1 * | 9/2013 | Chen | F23R 3/286 |
| | | | 60/747 |
| 2014/0366551 A1 * | 12/2014 | Prociw | F23R 3/28 |
| | | | 60/776 |
| 2019/0010872 A1 | 1/2019 | Dam et al. | |
| 2019/0032561 A1 * | 1/2019 | Stoia | F23R 3/286 |
| 2020/0309378 A1 * | 10/2020 | Dam | F02C 7/264 |
| 2021/0215100 A1 * | 7/2021 | Head | F23R 3/045 |
| 2022/0093517 A1 * | 3/2022 | Aleksov | H01L 24/06 |
| 2022/0099030 A1 * | 3/2022 | Happ | F01D 25/145 |
| 2022/0195933 A1 * | 6/2022 | Ryon | F23R 3/346 |
| 2022/0195937 A1 * | 6/2022 | Ryon | F23R 3/283 |

FOREIGN PATENT DOCUMENTS

| | | | | |
|---|---|---|---|---|
| CN | 113864816 A | * | 12/2021 | A63J 5/02 |
| CN | 113864816 A | | 12/2021 | |
| EP | 3805642 A1 | | 4/2021 | |
| GB | 859184 A | | 1/1961 | |
| GB | 869652 A | | 6/1961 | |
| GB | 1050167 A | * | 12/1966 | B29B 13/024 |
| GB | 1050167 A | | 12/1966 | |

* cited by examiner

PASSIVE SECONDARY AIR ASSIST NOZZLES

CROSS-REFERENCE TO RELATED APPLICATIONS

This is a divisional of U.S. patent application Ser. No. 17/360,207 filed Jun. 28, 2021 the content of which is incorporated by reference herein in its entirety.

BACKGROUND

Technical Field: This disclosure relates generally to gas turbine engines and, more particularly, to torch ignitors and methods suitable for their use in the combustor section of a gas turbine engine.

Background of Related Art: Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for main fuel injectors within the combustor, allowing for utilization of a greater range of fuel injector designs. Torch ignitors are intended to remain active while the gas turbine is operating for continuous ignition. Torch ignitors have generally been considered adequate for their intended purposes, but there is an ongoing need for improved performance in continuous ignition. This disclosure provides a solution for that need.

SUMMARY

An injection system includes an inner nozzle body defining a first air path along a longitudinal axis. The first air path defines a converging-diverging section between an upstream portion of the first air path and an outlet orifice of the first air path. A main orifice is defined at a narrowest portion of the converging-diverging section. A fuel circuit wall is outboard of the inner nozzle body. A fuel path is defined between the fuel circuit wall and the inner nozzle body. An outer nozzle body outboard of the fuel circuit wall has a second air path defined through the outer nozzle body for communication of air from the outer nozzle body into the first air path, wherein the second air path meets the first air path at a second orifice in the first air path downstream of the main orifice of the inner nozzle body.

The second air path can have a terminal section that defines an oblique angle with the longitudinal axis. The oblique angle can be acute relative to a portion of the longitudinal axis upstream of the second orifice.

The second air path can pass from a first section through the outer nozzle body, to a second section that passes between the outer nozzle body and the fuel circuit wall, to a terminal section of the second air path and into the first air path at the second orifice. The first air path can enter the converging-diverging section along an upstream portion of the longitudinal axis. The first section of the second air path can approach the second orifice from a direction along a downstream portion of the longitudinal axis, opposite the upstream portion. The second air path can turn from the direction along a downstream portion of the longitudinal axis, about an upstream end of the fuel circuit wall, and can continue in a downstream direction through the terminal portion of the second air path.

The outer nozzle body can define a combustion chamber of a torch ignitor downstream of the outlet orifice for combustion of fuel and air issued into the combustion chamber from the first and second air paths and from the fuel path. At least one ignitor can be mounted to the outer nozzle body with a respective ignition end inside the combustion chamber to ignite a fuel air mixture within the combustion chamber. A mounting flange can be defined at outlet portion of the outer nozzle body for mounting the outer nozzle body to an engine case. A torch outlet can be located downstream of the combustion chamber for issuing a flame into a combustor of a gas turbine engine. The mounting flange can be mounted to the engine case of a gas turbine engine. A combustor of a gas turbine engine can be within the engine case, wherein the torch outlet is mounted to an opening through a wall of the combustor. One or more fuel injectors can be mounted to the combustor upstream from the opening through the wall of the combustor to issue fuel and air into the combustor.

The second air path can be in fluid communication with an air jacket in the outer nozzle body defined about the combustion chamber. The air jacket can be an inlet in fluid communication with a compressor outlet plenum defined between the combustor and the engine case for supplying air to the second air path. The second air path can pass from a plurality of first sections through the outer nozzle body, through a plurality of respective holes into to a single second section that passes between the outer nozzle body and the fuel circuit wall, to a plurality of terminal sections of the second air path, and into the first air path at a plurality of respective second orifices.

A method of ignition for a gas turbine engine includes issuing air from a compressed air source through a first air path into a combustion chamber in a torch ignitor of a gas turbine engine. The method includes issuing fuel from a fuel circuit in the torch ignitor into the combustion chamber, initiating ignition of the fuel and air in the combustion chamber, and using a flame from the torch ignitor to initiate combustion in a combustor of the gas turbine engine. The method also includes issuing air from a compressor section of the gas turbine engine through a second air path that feeds into the first air path wherein the second air path meets the first air path at a second orifice in the first air path downstream of the main orifice of the inner nozzle body.

The method can include ceasing issuing air from the compressed air source after the compressor section is powered to issue air through the second air path. The method can include entraining air through the second path into the first air path using airflow through the first air path. It is also contemplated that the method can include relighting the combustor of the gas turbine engine at altitude. Relighting can include issuing air through the first air path from the compressed air source into the combustion chamber of the torch ignitor.

These and other features will become more readily apparent from the following detailed description and the accompanying drawings.

DETAILED DESCRIPTION

Figure 1:
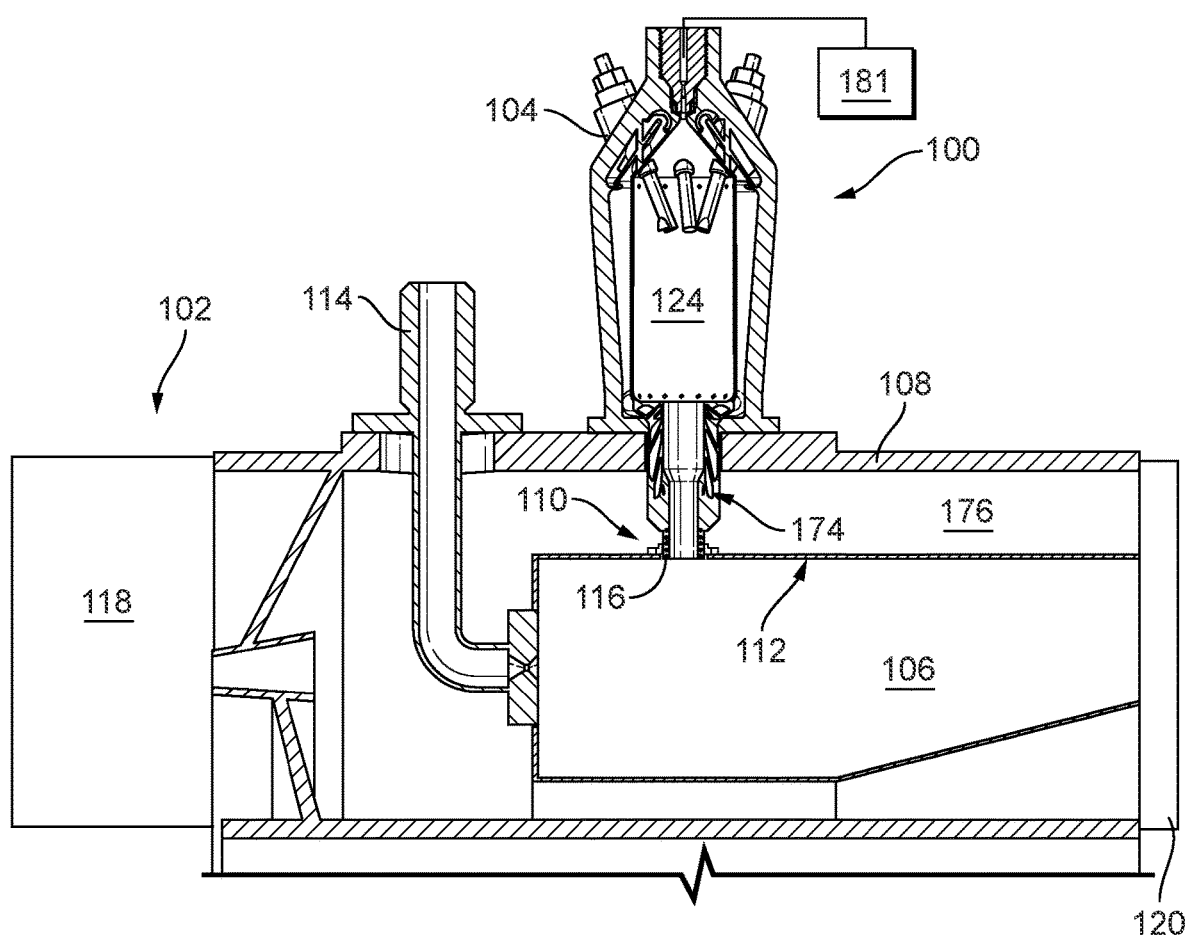
FIG. 1 is a schematic cross-sectional side elevation view of a portion of a gas turbine engine constructed in accordance with the present invention, showing the torch ignitor mounted to the engine case and combustor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to improve air assist functionality in continuous ignition systems for gas turbine engines.

The injection system 100 for a gas turbine engine 102 includes a torch ignitor 104. A combustor 106 of the gas turbine engine 102 is within the engine case 108 of the gas turbine engine 102. The torch outlet 110 is mounted to an opening 116 through a wall 112 of the combustor 106. One or more fuel injectors 114 (only one of which is shown in the annular cross-section of FIG. 1) are mounted to the combustor 106 upstream from the opening 116 to issue fuel and air into the combustor 106. A compressor 118 (indicated schematically in FIG. 1) is situated upstream of the combustor 106 to supply compressed air to the combustor 106 through the fuel injectors 114. A turbine section 120 (indicated schematically in FIG. 1) is located downstream of the combustor 106 to receive combustion products therefrom for production of power and/or thrust, some of the power of which can be used to power the compressor section 118. A compressed air source 181 is connected to the torch ignitor 104, as described in more detail below.

Figure 2:
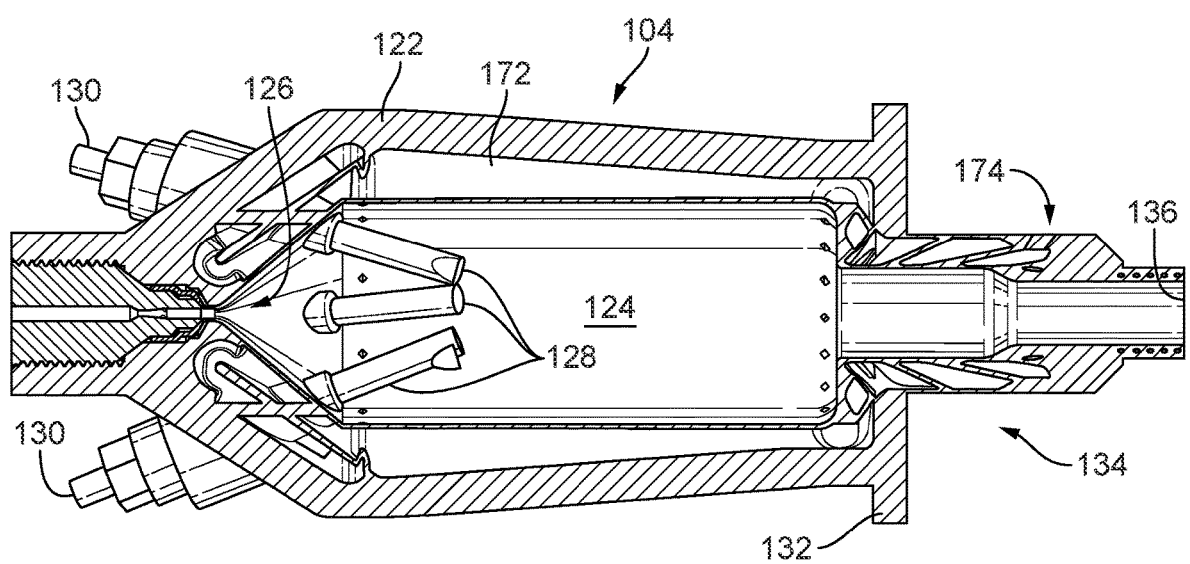
FIG. 2 is schematic cross-sectional side-elevation view of the torch ignitor of FIG. 1, showing the combustion chamber and ignitors.

With reference now to FIG. 2, the torch ignitor 104 includes an outer nozzle body 122 which defines a combustion chamber 124 downstream of an outlet orifice 126. A plurality of ignitors 130 are mounted to the outer nozzle body 122 with a respective ignition end 128 inside the combustion chamber 124 to ignite a fuel air mixture within the combustion chamber 124.

A mounting flange 132 is defined at outlet portion 134 of the outer nozzle body 122 for mounting the outer nozzle body 122 to the engine case 108 (as shown in FIG. 1). The torch outlet 110 is located downstream of the combustion chamber 124 for issuing a flame into the combustor 106 as shown in FIG. 1.

Figure 3:
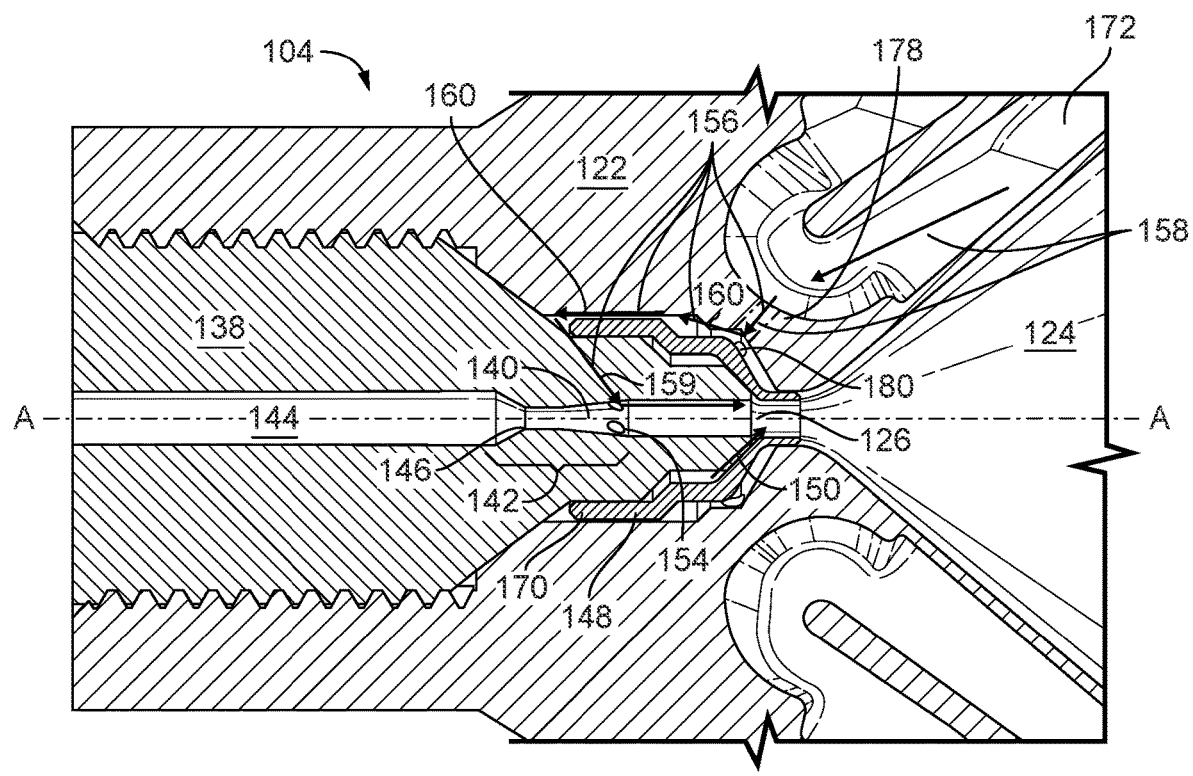
FIG. 3 is a schematic cross-sectional side-elevation view of a portion of the torch ignitor of FIG. 1, showing the air paths in the inner and outer nozzle components.

Referring to FIG. 3, the torch ignitor 104 includes an inner nozzle body 138 defining a first air path 140 along a longitudinal axis A. The first air path 140 defines a converging-diverging section 142 between an upstream portion 144 of the first air path 140 and the outlet orifice 126 of the first air path 140. A main orifice 146 is defined at a narrowest portion of the converging-diverging section 142. A fuel circuit wall 148 is seated outboard of a tip portion of the inner nozzle body 138. A fuel path 150 is defined between the fuel circuit wall 148 and the inner nozzle body 138. The outer nozzle body 122 is outboard of the fuel circuit wall 148 and has a second air path 156 defined through the outer nozzle body 122 for communication of air from the outer nozzle body 122 into the first air path 140. The second air path 156 meets the first air path 140 at a second orifice 154 in the first air path 140 downstream of the main orifice 146. The first and second air paths 140, 156 and the fuel path 150 issue an atomized mixture of fuel and air into the combustion chamber 124.

Referring again to FIG. 3, the second air path 156 passes from a first section 158 through the outer nozzle body 122, to a second section 160 that passes between the outer nozzle body 122 and the fuel circuit wall 148, to the terminal section 159 of the second air path and into the first air path 140 at the second orifice 154. The upstream portion 144 of the first air path 140 enters the converging-diverging section 142 along an upstream portion of the longitudinal axis A, i.e., the first air path enters from the left as oriented in FIG. 3. The first portion, e.g. sections 158 and 160, of the second air path 156 approaches the second orifice 154 from a direction along a downstream portion of the longitudinal axis A, i.e. opposite the upstream portion or from the right hand side as oriented in FIG. 3. The second air path 156 turns about an upstream end 170 of the fuel circuit wall 148, and continues in a downstream direction through the terminal portion 159 of the second air path 156.

The second air path 156 is in fluid communication with an air jacket 172 in the outer nozzle body 122 defined about the combustion chamber 124. The air jacket 172 has an inlet 174 (labeled in FIGS. 1 and 2) in fluid communication with a compressor outlet plenum 176 (labeled in FIG. 1) defined between the combustor 106 and the engine case 108 for supplying air to the second air path 156. The second air path 156 passes from the air jacket 172 through a plurality of first sections 178 through the outer nozzle body 122, through a plurality of respective holes 180 into to the single second section 160 that passes between the outer nozzle body 122 and the fuel circuit wall 148, to a plurality of terminal sections 159 each of which feeds and into the first air path 140 at a respective second orifice 154.

With continued reference to FIGS. 1-3, a method of ignition for the gas turbine engine 102 includes issuing air from a compressed air source 181, e.g. a compressed air tank, auxiliary air compressor, or the like, through the first air path 140 into a combustion chamber 124. The method includes issuing fuel from a fuel circuit 150 in the torch ignitor 104 into the combustion chamber 124, initiating ignition of the fuel and air in the combustion chamber 124, and using a flame from the torch ignitor 104 to initiate combustion in a combustor 106 of the gas turbine engine 102. This first air path 140 provides assist air for ignition when there is inadequate air from the compressor section 118, e.g. before the compressor section is fully powered up during start up or relight. During use of the assist air, the flow of assist air in the first air path 140 can entrain airflow through the second air path 156 into the first air path 140.

The method also includes issuing air from a compressor section 118 of the gas turbine engine 102 through the second air path 156 that feeds into the first air path 140. The method can include ceasing issuing air from the compressed air source 181 after the compressor section 118 is powered to issue air through the second air path 156. Relighting can include issuing air through the first air path 140 from the compressed air source 181 into the combustion chamber 124 of the torch ignitor 104 at altitude.

Figure 4:
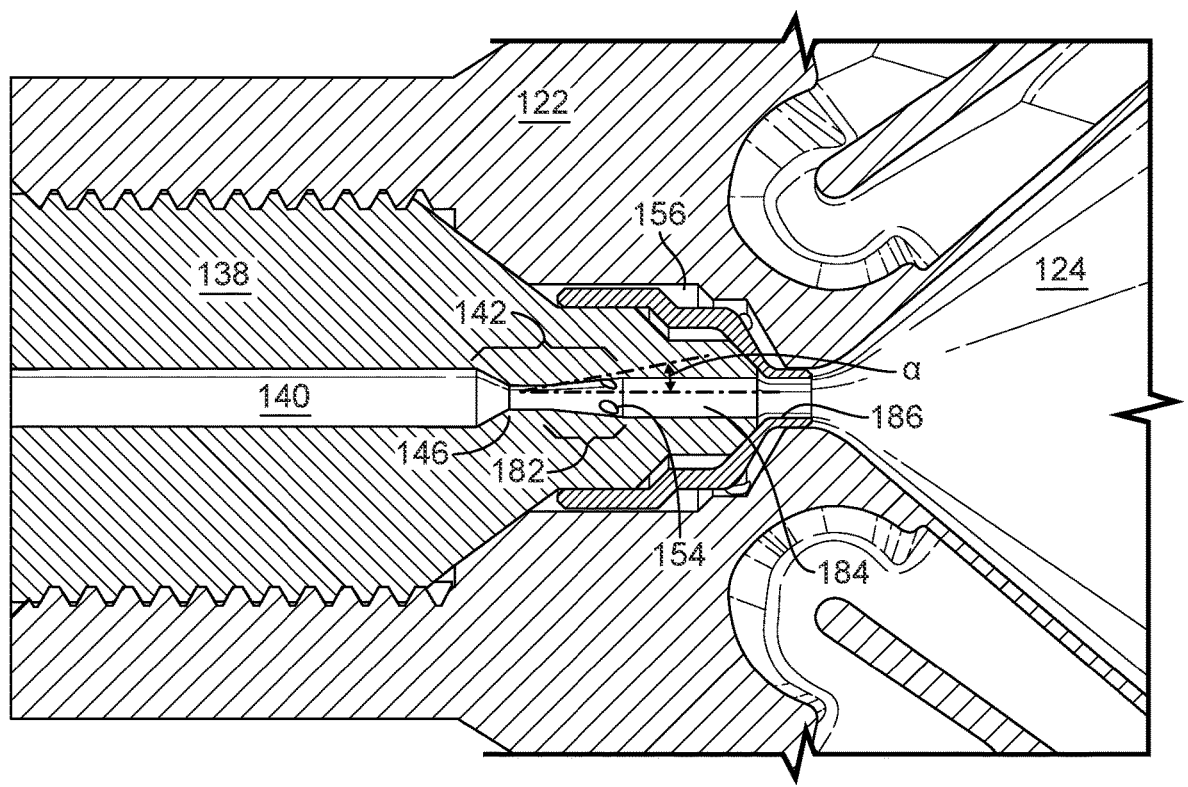
FIG. 4 is a schematic cross-sectional side elevation view of the portion of the torch ignitor of FIG. 3, showing the diffuser angle of the first air path.

With reference now to FIG. 4, the converging-diverging section 142 provides a restriction in the first air flow path which accelerates the flow of air to a high velocity which helps to atomize the fuel. The diverging portion of the converging-diverging section 142 is a diffuser 182, where the second orifices 154 are located. If the diffuser angle α is too large or if the duct 184 between the diffuser 182 and where it meets the fuel at the outlet orifice 126 is too short, the primary air flow through the first air path 140 may separate from the wall or surface of the diffuser 182. This means that the air from the first air circuit 140 may separate into a jet which may not reach out to the fuel filming surface 186 and insufficient atomization could occur during air-assist operation as described above.

Figure 5:
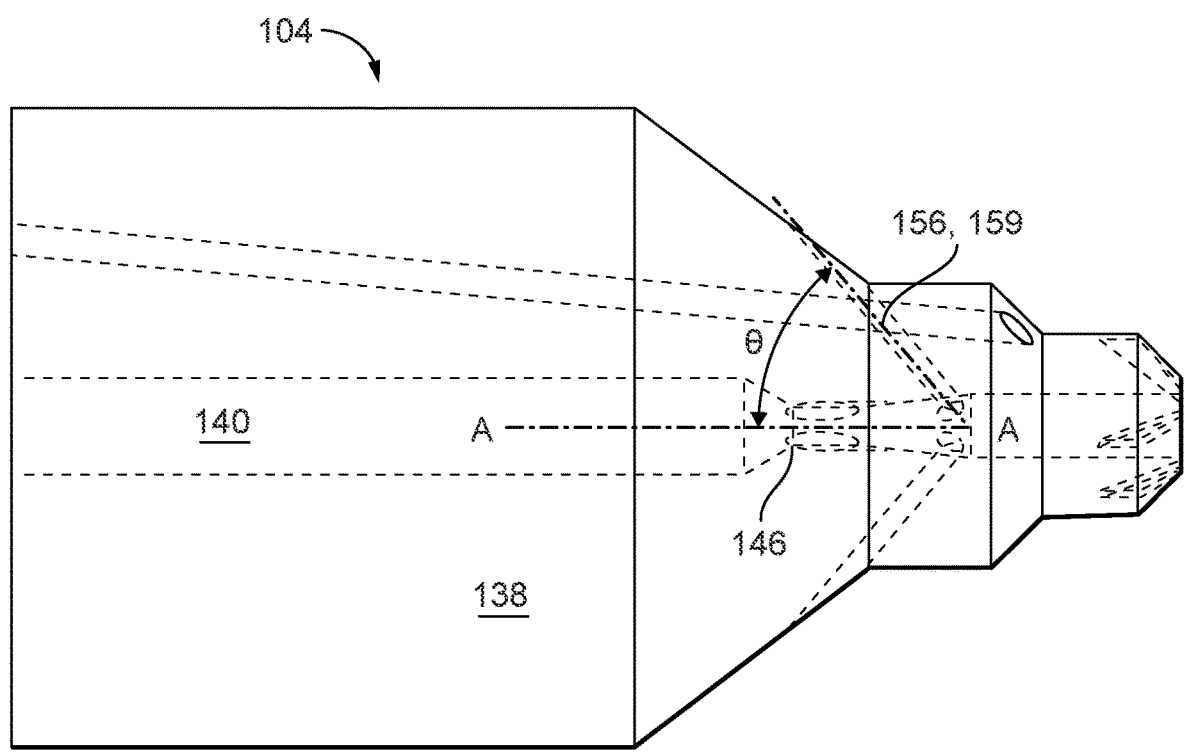
FIG. 5 is a schematic cross-sectional side elevation view of a portion of the torch ignitor of FIG. 2, showing the angle of the terminal portions of the second air path.

Referring now to FIG. 5, the second air path 156 has a terminal section 159 through a portion of the inner nozzle body 138 that defines an oblique angle θ with the longitudinal axis A. The oblique angle θ is acute relative to a portion of the longitudinal axis A upstream of the second orifice 154. With this acute angle θ, and with the second orifices 154 downstream of the main orifice 146, when the air assist in the first a path 140 is switched over to regular operation air from the second air path 156, proper air flow for atomization of the fuel can be achieved. Having the acute angle and second orifices 154 downstream of the main orifice 146 also prevents the first flowing air from flowing in a reverse direction into the second air path 156 during first flowing air operation. This improves the efficiency at which the first flowing air can atomize the fuel.

While the apparatus and methods of the subject disclosure have been shown and described, those skilled in the art will readily appreciate that changes and/or modifications may be made thereto without departing from the scope of the subject disclosure.

What is claimed is:

1. An injection system comprising:
    an inner nozzle body defining a first air path along a longitudinal axis, wherein the first air path defines a converging-diverging section between an upstream portion of the first air path and an outlet orifice of the first air path, wherein a main orifice is defined at a narrowest portion of the converging-diverging section;
    a fuel circuit wall outboard of the inner nozzle body, wherein a fuel path is defined between the fuel circuit wall and the inner nozzle body; and
    an outer nozzle body outboard of the fuel circuit wall with a second air path defined through the outer nozzle body for communication of air from the outer nozzle body into the first air path, wherein the second air path meets the first air path at a second orifice in the first air path downstream of the main orifice of the inner nozzle body,
    wherein the second air path passes from a first section through the outer nozzle body, to a second section that passes between the outer nozzle body and the fuel circuit wall, to a terminal section of the second air path and into the first air path at the second orifice,
    wherein the first air path enters the converging-diverging section along an upstream portion of the longitudinal axis, and wherein the first section of the second air path approaches the second orifice from a direction along a downstream portion of the longitudinal axis, opposite the upstream portion, wherein the outer nozzle body defines a combustion chamber of a torch ignitor downstream of the outlet orifice for combustion of fuel and air issued into the combustion chamber from the first and second air paths and from the fuel path.

2. The system as recited in claim 1, wherein the second air path turns from the direction along a downstream portion of the longitudinal axis, about an upstream end of the fuel circuit wall, and continues in a downstream direction through the terminal portion of the second air path.

3. The system as recited in claim 1, wherein the second air path has a terminal section that defines an oblique angle with the longitudinal axis.

4. The system as recited in claim 3, wherein the oblique angle is acute relative to a portion of the longitudinal axis upstream of the second orifice.

5. The system as recited in claim 1, further comprising:
    at least one ignitor mounted to the outer nozzle body with a respective ignition end inside the combustion chamber to ignite a fuel air mixture within the combustion chamber;
    a mounting flange defined at an outlet portion of the outer nozzle body for mounting the outer nozzle body to an engine case; and
    a torch outlet downstream of the combustion chamber for issuing a flame into a combustor of a gas turbine engine.

6. The system as recited in claim 5, further comprising:
    the engine case, wherein the mounting flange is mounted to the engine case;
    a combustor of a gas turbine engine within the engine case, wherein the torch outlet is mounted to an opening through a wall of the combustor; and
    one or more fuel injectors mounted to the combustor upstream from the opening through the wall of the combustor to issue fuel and air into the combustor.

7. The system as recited in claim 6, wherein the second air path is in fluid communication with an air jacket in the outer nozzle body defined about the combustion chamber, wherein the air jacket has an inlet in fluid communication with a compressor outlet plenum defined between the combustor and the engine case for supplying air to the second air path.

8. The system as recited in claim 7, wherein the second air path passes from a plurality of first sections through the outer nozzle body, through a plurality of respective holes into to a single second section that passes between the outer nozzle body and the fuel circuit wall, to a plurality of terminal sections of the second air path and into the first air path at a plurality of respective second orifices.

\* \* \* \* \*